United States Patent
Doyle et al.

(10) Patent No.: US 7,653,765 B2
(45) Date of Patent: Jan. 26, 2010

(54) INFORMATION COMMUNICATION CONTROLLER INTERFACE APPARATUS AND METHOD

(75) Inventors: John Doyle, Falkirk (GB); John Logan, Glasgow (GB); Michael Rohleder, Unterschleissheim (DE); Stephen Pickering, Hamilton (GB)

(73) Assignee: Freescale Semiconductor, Inc., Austin, TX (US)

( * ) Notice: Subject to any disclaimer, the term of this patent is extended or adjusted under 35 U.S.C. 154(b) by 862 days.

(21) Appl. No.: 10/507,157

(22) PCT Filed: Nov. 11, 2002

(86) PCT No.: PCT/EP02/12821

§ 371 (c)(1),
(2), (4) Date: Oct. 13, 2005

(87) PCT Pub. No.: WO03/071744

PCT Pub. Date: Aug. 28, 2003

(65) Prior Publication Data

US 2006/0059278 A1     Mar. 16, 2006

(30) Foreign Application Priority Data

Feb. 20, 2002  (GB) ................................. 0204044.2

(51) Int. Cl.
*G06F 3/00*     (2006.01)
(52) U.S. Cl. .................... 710/30; 709/236; 712/226; 712/244
(58) Field of Classification Search .................. 710/30; 709/236

See application file for complete search history.

(56) References Cited

U.S. PATENT DOCUMENTS

| 5,732,074 | A | * | 3/1998 | Spaur et al. .................. 370/313 |
| 5,784,640 | A | * | 7/1998 | Asghar et al. .................. 712/35 |
| 5,854,454 | A | * | 12/1998 | Upender et al. .............. 187/247 |
| 5,946,298 | A | * | 8/1999 | Okuyama .................... 370/232 |
| 5,983,365 | A | * | 11/1999 | Van de Pol et al. ............ 714/31 |
| 6,515,993 | B1 | * | 2/2003 | Williams et al. ....... 370/395.53 |
| 6,963,586 | B2 | * | 11/2005 | Henriksson et al. ......... 370/469 |

FOREIGN PATENT DOCUMENTS

| EP | 0 930 759 A1 | 7/1999 |
| EP | 1 085 720 A2 | 3/2001 |

OTHER PUBLICATIONS

Szydlowski, "A Gateway for CAN Specification 2.0 Non-Passive Devices," *Sae Technical Paper Series, Society of Automotive Engineers, XP002062365*, Warrendale, PA, US, 1993, pp. 29-36.
Wolf, "Connecting C166 and C500 Microcontrollers to CAN," *Siemens XP002157028*, Jun. 1997, pp. 1-63.
PCT Search Report PCT/EP02/12821 mailed Apr. 15, 2003.

* cited by examiner

*Primary Examiner*—Henry W. H. Tsai
*Assistant Examiner*—Elias Mamo

(57) ABSTRACT

An apparatus and method for communicating information within a network having one or more communication buses (5, 6, 7, 8), consisting of one or more elements (20, 30, 40) to maximise throughput and minimise CPU involvement by executing the following. Compare incoming message identifiers (14) against a set of predetermined identifiers (22). Transpose data sets (12) within the incoming message data frame and where necessary, save and/or transmit new frames as defined by operations dependent upon the incoming identifier. By utilising an optimal set of operands the memory requirement is satisfied by a minimal size of standard type.

8 Claims, 3 Drawing Sheets

INFORMATION COMMUNICATION CONTROLLER INTERFACE APPARATUS AND METHOD

FIELD OF THE INVENTION

The present invention relates generally to signal communication controller interfaces and methods. More specifically, the invention relates to an apparatus and method for communicating information within a network having communication units according to a communication protocol, for example the Control Area Network (CAN) protocol used in the automotive and industrial applications.

BACKGROUND OF THE INVENTION

Communication networks typically involve transferring information between nodes connected in the network by at least one communication bus. Information is transferred from one node to another node via the physical medium according to a communication protocol. Such a protocol is the Control Area Network (CAN) protocol used for example in automotive applications. Different protocols might be used on different buses within the same network to have the best match to a particular communication need.

Often, there are multiple, independent communication busses in such applications. The busses are connected to each other via an information controller interface or gateway device. Information is transferred from one bus to another bus (or back to the same bus) via the gateway in information units, usually referred to as message frames. Each frame consists of a data part containing the information to be transferred; a frame identifier and optional ancillary information. The ancillary information is used to attain complete error-free transmissions and requires the transfer of a fixed amount of extra information bits per frame, ie CRC, bit-stuffing etc. For example in CAN automotive networks, a frame comprises of a data part of between 0 and 8 bytes of information.

To minimise the overhead from identifiers and ancillary data, using the maximum data part per frame is required. This is achieved by a node, through the packing of several constituent pieces of data into one frame data part. Each one of these atomic data sets of is called a signal. For example, in the CAN protocol, a frame comprises of a data part of between 0 and 8 bytes of information. Each data set or signal within that data part may have differing lengths from 1 to 64 bits, upto a cumulative maximum of 64 bits. The frames are transmitted with pre-defined identifiers upon which when received at the gateway or a node, the identifier determines the position and size of all the signals within the frame. An issue of this method is that the data sets within a frame may start at any bit position and are often crossing byte boundaries. Extraction and further processing of this data must take this into account and provide the needed computation power. Consequently, when a gateway device has to transfer a data set from one bus to another, a repeating series of activities has to be performed. The typical steps involved are, establishing the size and positions of the data sets from the frame identifier; unpacking the frame into it's data sets; transposing the data sets as required; packing the data sets into another, new or already created frame; and finally transmitting the frames to their destination bus as required. Executing these operations has typically been accomplished with software requiring extensive memory for the software programs, and placing high demands on the central processor unit (CPU) and supporting hardware. As the number of signals increases the CPU processing power required increases and also results in increased message latency and more frequent CPU interrupts and loading. Attempts have been made, for example WO99/34560, to provide a message bridge to transfer complete frames between CAN busses, however, these systems are still memory intensive, and still demand CPU time.

Thus, there is a need for an information communication controller interface or gateway device and method that efficiently controls the communication and transfer of signal based messages for faster operations minimises at least message latency, memory requirements, or CPU interrupts and loading.

STATEMENT OF THE INVENTION

In accordance with the invention there is provided a communication controller interface as claimed in claim 1, and a method as claimed in claim 7.

BRIEF DESCRIPTION OF THE DRAWINGS

Embodiments of the invention will now be more fully described, by example, with reference to the drawings, of which.

DESCRIPTION OF THE PREFERRED EMBODIMENTS

Figure 1:
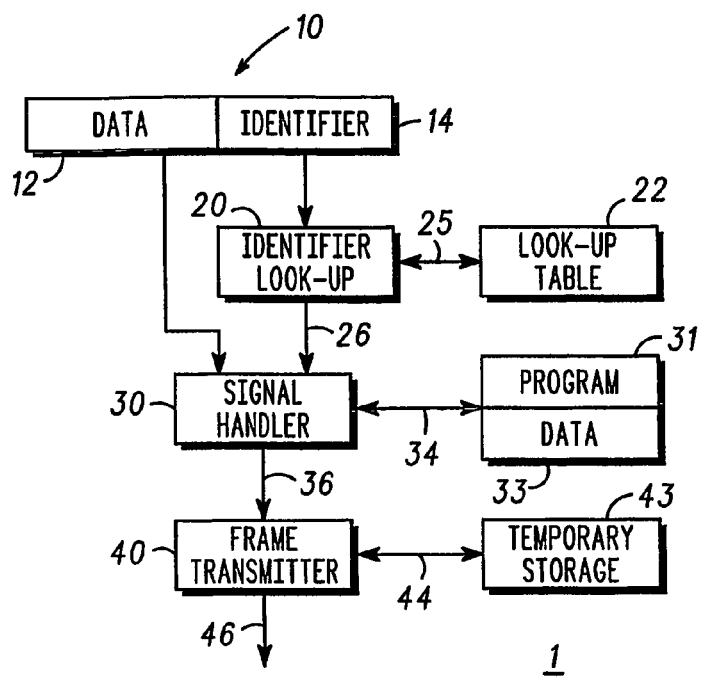
FIG. 1 shows a schematic block diagram of communication controller interface according to an embodiment of the invention.

Referring to FIG. 1, a schematic block diagram of communication controller interface or gateway 1 according to an embodiment of the invention is shown. The protocol receive and transmit blocks are excluded for brevity. The gateway 1 transfers information within a communication network, such as signal based communication system, having communication units or frames 10 containing packets of information according to a communication protocol, for example the Control Area Network (CAN) protocol standard that is currently used in the automotive industry. Of course, it will be appreciated by those skilled in the art that these embodiments of the invention may be adapted to other communication protocols such as Local Interconnect Network (LIN) or FlexRay, and future communication protocols or advances to present communication protocols.

The input frames 10 of information comprise data 12 and an identifier 14. The frames that make up a data stream may be configured for a specific communication protocol, for example in CAN an identifier has either 11 or 29 bits and the data part of the frame consists of 0 to 8 bytes. The maximum length of the identifier will be defined by the hardware implementation. However protocols with identifiers of varying lengths up to the maximum can be used at the same time. Each protocol receiver will have an additional part of the identifier associated with it. There is no limit on the amount of identifiers other than the available memory and possibly limits imposed by the hardware implementation.

The data sets within an input frame 10 is transferred to one or more output frames 36 by essentially two processing elements, the identifier look-up element 20 and the signal handler element 30. A third element 40 is provided for sequencing the stream of output frames 46 in accordance with a communications protocol.

The identifier look-up processing element 20 receiving the identifier 14 portion of the input frame 10, uses a binary search algorithm implemented in hardware to find a matching identifier in the look-up table 22. To accommodate this, the list of identifiers in the look-up table 22 must be sorted. The usage of a binary search is possible, since the list of recognised user-defined identifiers is always known. If there is no matching identifier found, then the frame may be simply ignored or the central processing unit (CPU) can be alerted about such an event via the CPU interface receive 3 (shown in FIG. 3). This permits the proper reaction of the CPU to unexpected messages, which is required for proper error analysis.

Special memory types, e.g. Content Addressable Memory (CAM), have been for this purpose. CAM memories are large and therefore used sparingly. Subsequently the CAM approach limits the amount of identifiers that can be used. Using a binary search implemented in hardware instead is superior here, because it permits to use normal, smaller standard memory for this purpose. The processing speed obtained using the binary search is fully sufficient within the given constraints and allows for a large amount of identifiers to be used. If a matching identifier is found in the look-up table 22, the associated value, further referred to as a program selector 26 is sent to the signal handler 30. This selector 26 and is used to select a sequence of user defined operations to be on the signals enclosed in the data portion 12 of the frame 10.

The program selector 26 defining the operations to be performed is based upon the identifier 14, and not a local software program as achieved in prior configurations.

Examples of the operations performed by the signal handler 30 may be simply "merge", "save", and "send" command, any of these commands can be made conditional upon predefined criteria being met. The alerting of the CPU for exceptional identifiers and the creation of outgoing frames with their relevant identifiers is accommodated here. The signal handler uses a temporary storage area 33 to store the resulting outgoing frames along with ancillary information such as conditional flags and message locks, and the like. The microcodes for the required operations are stored with the outgoing identifiers within the program memory 31. There is no limit to the number of operations associated with any one identifier, or stored within the memory save the limit defined by the implementation.

Conveniently, all the data within the program 31 and data memory 33 of the signal handler, as well as the identifiers in the look-up table 22, may be accessible by the CPU, and/or may be created dynamically by the user. When a 'send' command is performed, the completed outgoing frame, with prefixed identifier, will be handled by the frame transmitter 40 for transmission according to the required priority mechanism.

Figure 2:
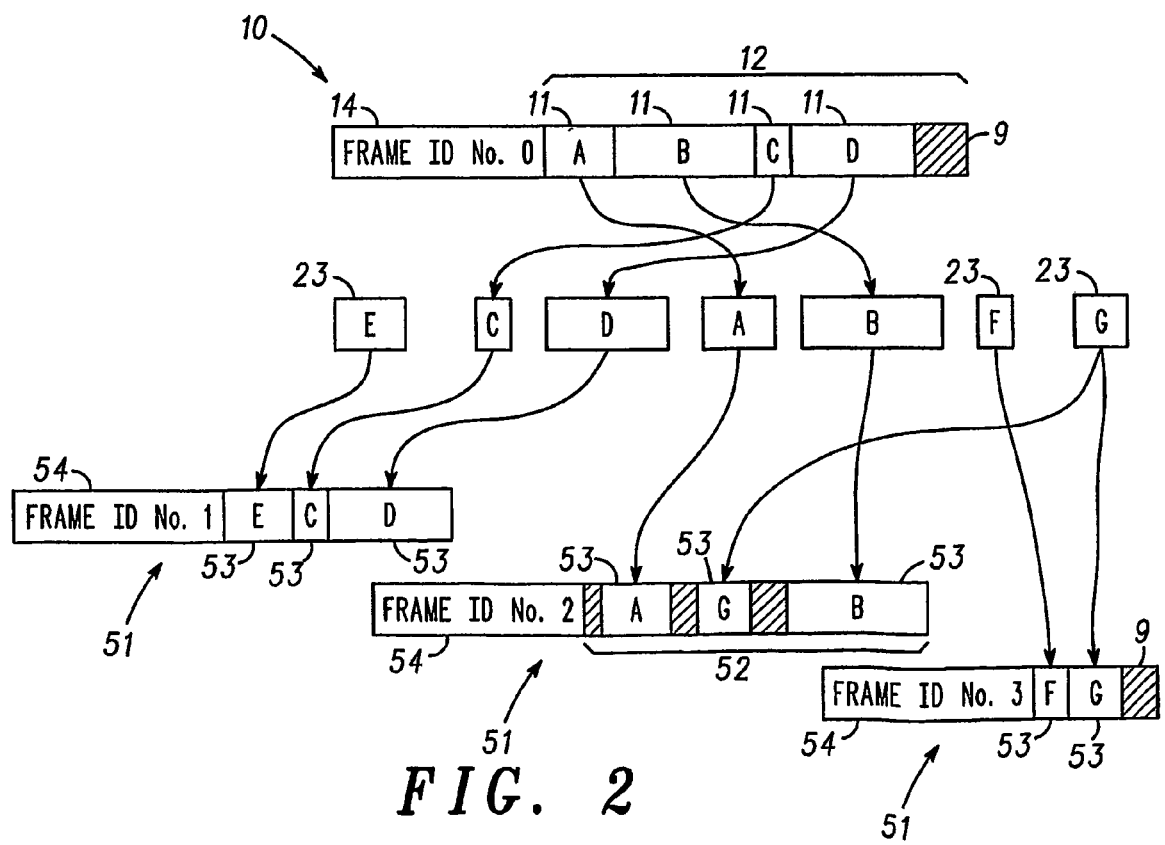
FIG. 2 shows an example of an input frame and output frames of information transferred through a communication controller interface according to an embodiment of the invention.

FIG. 2 shows one example input frame 10 and three created output frames 51 of information transferred through a communication controller interface according to an embodiment of the invention. The input frame shown contains identifier ID0 14, and corresponding sets of data 11, i.e. signals A and B, and C and D. Any unused data regions 9 of the data part of the message 12 may comprise of unrequired signals, or invalid areas present for further expansion of the system. The identifier ID0 is searched for within the look up table 22. In this example it is found and the associated operations from 31 are performed as follows. The data part 12 is split into its constituent signals A, B, C and D 11, and along with previously stored signals E, F and G 23 are used to create three new data parts 52 containing the transposed signals 53 and any unused areas 9. These data parts are stored in memory 33. As a result of this, or one or more further, incoming identifiers being matched, each outgoing message is prefixed with the relevant identifier 51 and scheduled for transmission, i.e. the messages 51 with ID1, ID2 and ID3. It is possible that incoming and/or outgoing messages have no signals or data part. These act as events and their associated actions are defined by the identifier value e.g. an incoming frame with ID5 might trigger the transmission of the frame with ID3. Data frames stored can be resent multiple times with the same or different identifiers, and to the same or different destination buses. Also signals can be placed into one or more outgoing messages i.e. signal G has been placed into two frames in FIG. 2.

After processing of the input frames by the identifier look-up processing element 20 and the signal handler 30 an output frame 36 is passed to the frame transmitter 40 in response to a "send" command. The frame transmitter 40 also has a temporary storage 43 to temporarily hold the output frame 36, until it is the appropriate time in accordance to protocol arbitration to send the transmitted output frame 46.

Figure 3:
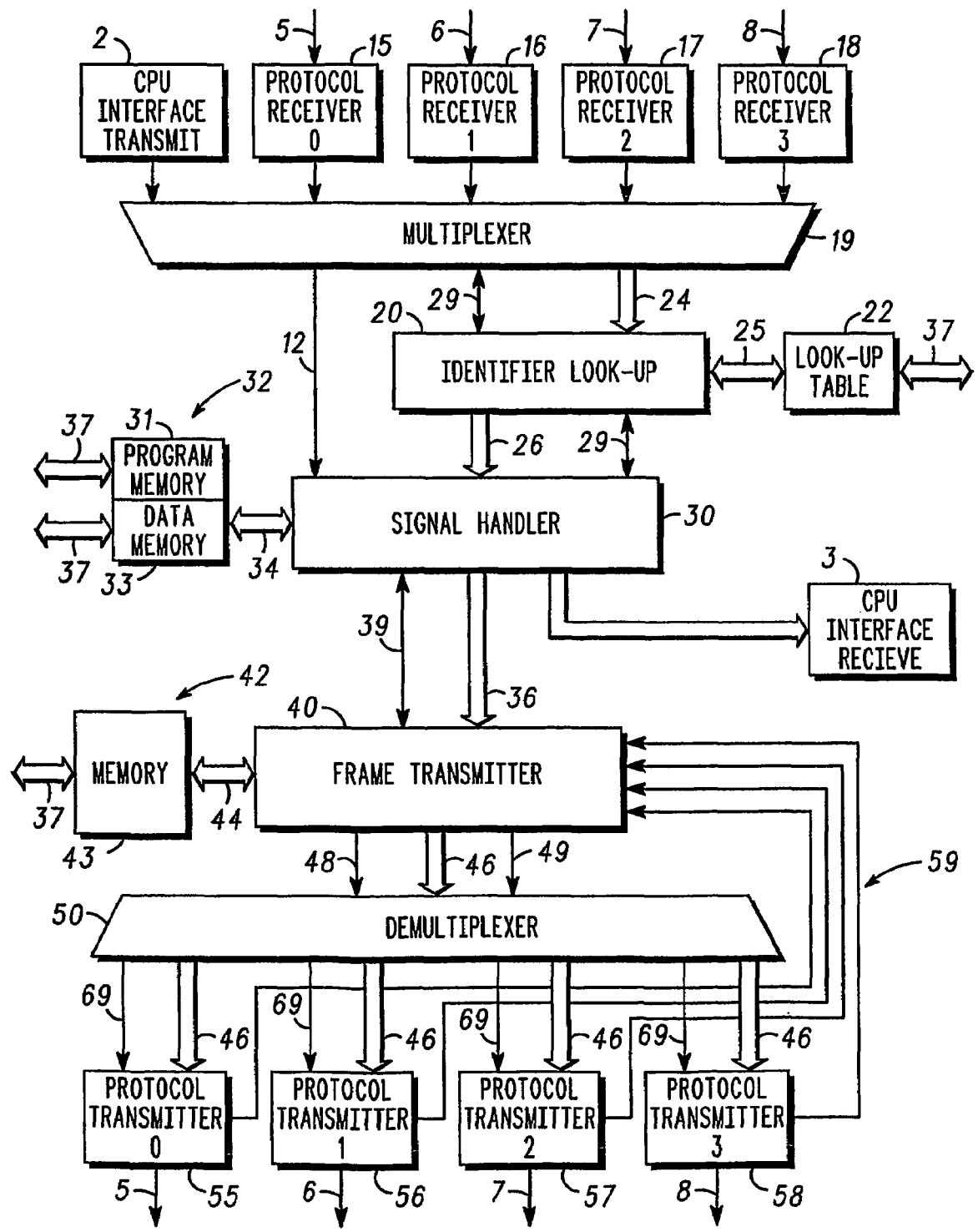
FIG. 3 shows a schematic block diagram the communication controller interface of FIG. 1 in more detail within a communication system according to an embodiment of the invention.

FIG. 3 shows a schematic block diagram of the communication controller interface of FIG. 1 in more detail within a communication system according to an embodiment of the invention. Like reference numerals in FIG. 1 are represented in FIG. 3. In the communication system depicted in FIG. 3, there are multiple buses 5, 6, 7, 8 that connect to the communication controller interface by protocol receivers 15, 16, 17, 18 via multiplexer 19 and protocol transmitters 55, 56, 57, 58 via demultiplexer 50. Any other number of buses might be used as long as the multiplexer and demultiplexer are properly adapted and other system constraints like timing can be met by the actual implementation. Each of the protocol receivers 15, 16, 17, 18 and protocol transmitters 55, 56, 57, 58 is independent of each other and each is responsible to properly handle the protocol features assumed by the communication protocol used on the corresponding communication bus 5, 6, 7, 8. CPU interface transmitter 2 is connected to mulitplexer 19, it is required when the CPU initiates processing to be carried out by the controller. The CPU interface receiver 3 is connected to signal handler 30 and provides the features required to generate and process messages resulting from unmatched identifiers to the CPU, or identifiers where the operations are requesting some CPU notification. The CPU has full shared access to all storage objects used by the communication controller interface. In detail these are the look-up table 22, the microcode storage 31, the data memory 33 and the memory 43.

The temporary storage 33 contains message frames created by the signal handler that have not yet been send to the frame transmitter 40 and might be further modified by the signal handler or CPU to accommodate further changes or additions.

The temporary frame transmitter storage 42 contains the message frames that have been received from the signal handler 30 that are awaiting their transmission by the protocol transmitters 55, 56, 57, 58. It is worth noting that the temporary storage areas 22, 31, 33 and 42 can be physically located in the same memory. Transmission of a message frame from the signal handler 30 to the frame transmitter 40 does therefore not necessarily require the message frame to be provided. It is possible to only manipulate the data organisation in this storage to accommodate the same operation. Also, a control line link 29, 39, 49, 59, 69 is provided between each processing element of the controller interface 1 to ensure correct interfacing between each element.

Figure 4:
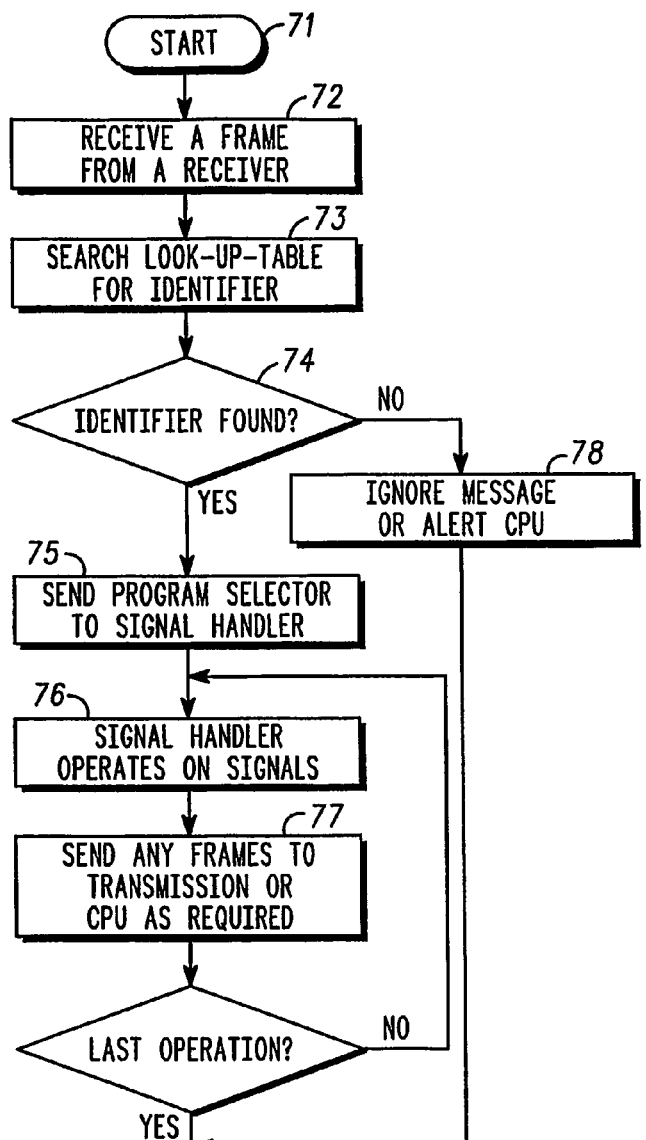
FIG. 4 shows a flow diagram of a method in accordance of an embodiment of the invention.

FIG. 4 shows a flow diagram 70 of a method according to an embodiment of the invention in detail with respect to a method for using a controller interface in a communication system. It comprises the steps of receiving the incoming message 72 containing an identifier 14 and data portion 12. Comparing the identifier against a sorted list of predefined identifiers 73. If there is a matching identifier 75 the associated program selector 26 is passed to the signal handler 30. The signal handler operates on the data signals 76 as defined by the operands within the program memory 31. Any frames to be transmitted are scheduled 77. When the last operand is completed the processing element waits for the next matching incoming identifier and associated handler 79. If no identifier is found 74, the controller can either ignore the incoming message or alert the CPU 78.

Figure 5:
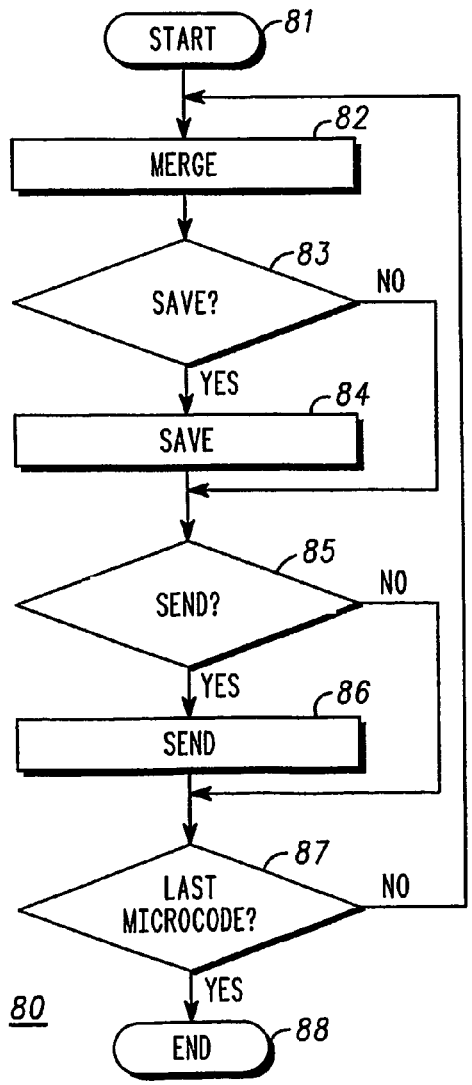
FIG. 5 shows a flow diagram of a method in accordance of an embodiment of the invention.

FIG. 5 describes in more detail the actions possible from one operand. A data set from the incoming frame is transposed 82 as defined. If required the resulting data frame is saved 84, and can also be scheduled for transmission 86 if necessary with the required identifier as defined in the microcode 33. On the last operation 87, the signal handler completes, otherwise it continues on to the next operand.

It will be appreciated that although the particular embodiments of the invention have been described above, various other modifications and improvements may be made by a person skilled in the art without departing from the scope of the present invention.

The invention claimed is:

1. An automotive information controller for an automotive communication system having at least one communication bus having an information unit with an identifier portion and a data portion corresponding to said identifier portion, said information controller comprising an identifier look-up element for sending a predetermined program selector to a signal handler upon determination that the identifier portion of a received information unit corresponds to a predetermined identifier associated with the predetermined program selector, wherein the program selector defines an operation to be performed on the data portion by the signal handler, the operation to be performed on the data portion being creation of a second information unit; or merging the data portion, or part of the data portion, with another data portion of a second information unit; or saving the data portion, or part of the data portion;

said identifier look-up element further comprises a look-up table for storing a list of identifiers, said identifier look-up element searching the look-up table in order to find said predetermined identifier and said predetermined program selector corresponding to said identifier portion; and said identifier look-up element is programmable to allow the predetermined identifier and/or the associated program selector to be changed.

2. An information controller as claimed in claim 1, further comprising a frame transmitter for prioritizing multiple second information units for transmission in accordance with a communication protocol.

3. An information controller as claimed in claim 2, wherein the second information units include a second identifier.

4. An information controller as claimed in claim 2, further comprising a transmission memory for storing multiple second information units.

5. An information controller as claimed in claim 1, wherein the signal handler further comprises memory for storing said data portion and a predetermined sequence of operations.

6. An information controller as claimed in claim 1, further comprising a central processor unit interface to allow direct communication between said information controller with a central processing unit of the communication system.

7. An information controller as claimed in claim 6, wherein said central processing unit can access any memory of the information controller.

8. A method for using an automotive information controller for an automotive communication system having at least one communication bus and having an information unit with an identifier portion and a data portion corresponding to said identifier portion, said method comprising:

receiving the identifier portion at an identifier look-up element, said identifier look-up element comprising a look-up table for storing a list of identifiers;

searching the look-up table in order to find a predetermined identifier and a predetermined program selector corresponding to said identifier portion, the identifier look-up element being programmable to allow the predetermined identifier and/or the associated program selector to be changed;

sending said predetermined program selector to a signal handler upon determination that the identifier portion corresponds to said predetermined identifier associated with the predetermined program selector;

performing an operation on the data portion based upon the program selector, the operation on the data portion being creation of a second information unit; or merging the data portion, or part of the data portion, with another data portion of a second information unit; or saving the data portion, or part of the data portion.

\* \* \* \* \*